United States Patent
Yahia et al.

(10) Patent No.: US 9,156,333 B2
(45) Date of Patent: Oct. 13, 2015

(54) SYSTEM FOR THE HEATING, VENTILATION, AND/OR AIR CONDITIONING OF A VEHICLE, COMPRISING AT LEAST ONE HEAT EXCHANGER THROUGH WHICH A HEAT-TRANSFER FLUID FLOWS

(75) Inventors: Mohamed Yahia, Paris (FR); Daniel Neveu, Massy (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 1187 days.

(21) Appl. No.: 12/486,232

(22) Filed: Jun. 17, 2009

(65) Prior Publication Data
US 2009/0314462 A1    Dec. 24, 2009

(30) Foreign Application Priority Data
Jun. 20, 2008    (FR) ...................................... 08 03445

(51) Int. Cl.
  *B60H 1/32*    (2006.01)
  *B60H 1/08*    (2006.01)
(52) U.S. Cl.
  CPC ................ *B60H 1/3227* (2013.01); *B60H 1/08* (2013.01)
(58) Field of Classification Search
  CPC .............................. B60H 1/323; B60H 1/3227
  USPC ................................................. 62/238.6, 335
  See application file for complete search history.

(56) References Cited

U.S. PATENT DOCUMENTS

| | | | |
|---|---|---|---|
| 5,784,893 A * | 7/1998 | Furuhama et al. | 62/333 |
| 6,085,532 A * | 7/2000 | Sibik | 62/179 |
| 6,178,929 B1 | 1/2001 | Schatz | |
| 6,246,831 B1 * | 6/2001 | Seitz et al. | 392/486 |
| 6,915,649 B2 * | 7/2005 | Amaral et al. | 62/244 |
| 6,935,414 B2 * | 8/2005 | Kawakubo et al. | 165/164 |
| 2007/0000457 A1 | 1/2007 | Guerrero et al. | |
| 2007/0144201 A1 * | 6/2007 | Matsumoto et al. | 62/335 |

FOREIGN PATENT DOCUMENTS

| | | |
|---|---|---|
| DE | 102006042788 A1 | 3/2008 |
| FR | 2852678 A1 | 9/2004 |

OTHER PUBLICATIONS

English language abstract for DE 102006042788 extracted from espacenet.com database, dated Oct. 5, 2009, 18 pages.
English language abstract for FR 2852678 extracted from espacenet.com database, dated Oct. 5, 2009, 20 pages.
INPI Institute National De La Propriete Industrielle Search Report for FA713011/FR0803445, dated Jan. 30, 2009, 1 page.

* cited by examiner

*Primary Examiner* — Cassey D Bauer
(74) *Attorney, Agent, or Firm* — Howard & Howard Attorneys PLLC

(57) ABSTRACT

The invention relates to a system for the heating, ventilation, and/or air conditioning of a motor vehicle passenger compartment. The system includes at least one heat exchanger through which there flows a heat-transfer fluid. The system is equipped with at least one means for pumping the heat-transfer fluid at a flow rate of between 40 1/h and 200 1/h, in such a way that a temperature difference of the heat-transfer fluid between an outlet and an inlet of the heat exchanger is greater than 45° C.

11 Claims, 3 Drawing Sheets

SYSTEM FOR THE HEATING, VENTILATION, AND/OR AIR CONDITIONING OF A VEHICLE, COMPRISING AT LEAST ONE HEAT EXCHANGER THROUGH WHICH A HEAT-TRANSFER FLUID FLOWS

RELATED APPLICATIONS

This application claims priority to and all the advantages of French Patent Application No. FR 08/03445, filed on Jun. 20, 2008.

TECHNICAL FIELD OF THE INVENTION

This invention relates to systems for the heating, ventilation, and/or air conditioning of a passenger compartment of a motor vehicle. It relates to such a system comprising a heat exchanger through which there flows a heat-transfer fluid.

PRIOR ART

A motor vehicle is often equipped with a heating, ventilation, and/or air-conditioning system to regulate the thermal parameters of the air in the passenger compartment of the vehicle.

Such a system includes a cooling circuit for the vehicle's engine. A first heat-transfer fluid, typically water and/or glycol, flows around the cooling circuit to carry away the heat generated by the engine to a first heat exchanger, such as an air radiator. The latter is swept by a first air stream, thereby heating it before it is fed into the passenger compartment.

Such a system also includes an air-conditioning loop for cooling a second air stream before it is fed into the passenger compartment. Said loop comprises a plurality of elements through which a refrigerant, such as a supercritical fluid, typically carbon dioxide or R744, flows in succession. These elements comprise at least one compressor, a second heat exchanger, usually known as a gas cooler, optionally an internal heat exchanger, an expansion member, an evaporator, and optionally an accumulator.

The gas cooler allows the refrigerant to cool by giving out heat to a second heat-transfer fluid. The latter may be a gas (generally air) or a liquid (generally water and/or glycol).

In both cases mentioned above, the refrigerant in the air-conditioning loop undergoes a thermodynamic cycle typically described in a Mollier diagram. It is prior art to deduce from this diagram a coefficient of performance or COP for said loop. The COP is defined as the ratio of useful power recovered by the gas cooler to energy consumed by the compressor to compress the refrigerant. The aim is always to ensure that the coefficient of performance or COP is as high as possible, for example about 3 to 4, in order to optimize the thermal comfort of a user of the vehicle while minimizing the amount of energy consumed.

In general terms, the overall efficiency of said system relies in a not insignificant manner on the respective efficiencies of the heat exchangers contained within the system. Designers of heating, ventilation, and/or air-conditioning systems are constantly seeking means for optimizing heat exchanges between on the one hand the first heat-transfer fluid flowing through the radiator and the first air stream, and on the other hand between the refrigerant flowing through the gas cooler and the second heat-transfer fluid which is to be heated up.

It is usually agreed that to facilitate such exchanges of heat, it is desirable that the flow rate of the heat-transfer fluid through the respective heat exchangers of said system be as high as possible, generally above 1000 l/h, and that a temperature difference of the heat-transfer fluid between the inlet and outlet of said respective heat exchangers be low, for example around 5° C. Under such conditions the coefficient of performance COP of the air-conditioning loop is often around 1, which is low. Designers of heating, ventilation, and/or air-conditioning systems have therefore generally opted for improving the thermal performance of the other elements of the system to counter this problem.

OBJECT OF THE INVENTION

A first object of the present invention is to provide a system for the heating, ventilation, and/or air conditioning of a motor vehicle, comprising an air-conditioning loop around which a refrigerant such as a supercritical fluid flows, and comprising at least one heat exchanger for heating a first air stream before it is fed into the passenger compartment, said system offering a satisfactory heating power in order to rapidly modify the thermal parameters of the air in the vehicle passenger compartment, even under extremely cold conditions of initial use of said system, in which the air is initially at a temperature of around −10° C. and in which it is nonetheless wished to rapidly feed into the passenger compartment the first air stream at a temperature of about 50° C., such a system consuming nevertheless as little energy as possible for a given procured thermal comfort, the desired coefficient of performance or COP of said loop being as high as possible, preferably more than 3 and ideally approaching 4.

A second object of the present invention is to provide a system of this kind in which the refrigerant exiting from the heat exchanger has a temperature as low as possible, typically less than 43° C.

A third object of the present invention is to provide a heat exchanger of this kind that is also adaptable to almost any heating, ventilation, and/or air-conditioning system in which the power unit of the vehicle may be a heat engine, an electric motor, or a hybrid engine, in which the desired thermal comfort inside the passenger compartment can be varied, that is to say requiring the thermal treatment of one to several regions of the passenger compartment, especially 4 distinct regions, and finally in which the space requirements of said system are desired to be as small as possible, such as underneath an instrument panel located in the passenger compartment of the vehicle.

The system of the present invention is a system for the heating, ventilation, and/or air conditioning of a motor vehicle passenger compartment. Said system comprises at least one heat exchanger through which there flows a heat-transfer fluid FC.

According to the present invention, said system is equipped with at least one means for pumping the heat-transfer fluid FC at a flow rate of between 40 l/h and 200 l/h, in such a way that a temperature difference of the heat-transfer fluid FC between an outlet and an inlet of the heat exchanger is greater than 45° C.

These arrangements are such that the heat exchanger of the system, which may equally well participate in an air-conditioning loop or in a cooling circuit of the latter, helps to optimize the efficiency of the system, and more particularly to ensure that the COP of said loop is greater than 3, ideally approaching 4. This result is achieved by firstly selecting a low flow rate of the heat-transfer fluid FC, of around 40 l/h to 200 l/h, and then also selecting a large temperature difference for the heat-transfer fluid FC between an outlet and an inlet of the heat exchanger, typically more than 45° C.

Said means is advantageously a constituent of a conveying circuit for the heat-transfer fluid FC.

In a first embodiment, said means comprises a pump with a variable and controlled flow rate participating in the conveying circuit.

In a second embodiment, said means comprises a plurality of flow paths for the heat-transfer fluid FC which are formed within the heat exchanger.

The heat exchanger may for example be a radiator.

The heat exchanger may also for example be a gas cooler participating in an air-conditioning loop around which a refrigerant FR flows.

The gas cooler may for example be a constituent of the conveying circuit.

The conveying circuit may also for example comprise a branch on which the gas cooler is installed.

The branch advantageously comprises:
- a first channel extending between a three-way valve and a first junction point P1 located on the conveying circuit upstream of the radiator in the direction of flow of the heat-transfer fluid FC within the conveying circuit,
- a second channel extending between the three-way valve and a second junction point P2 located on the conveying circuit downstream of the radiator in the direction of flow of the heat-transfer fluid FC within the conveying circuit, and
- a third channel extending between the three-way valve and a third junction point P3 located on the conveying circuit downstream of the radiator in the direction of flow of the heat-transfer fluid FC within the conveying circuit.

The gas cooler is preferably arranged on the third channel, in which case said means consists of: the three-way valve; a first valve arranged on the conveying circuit downstream of the third point P3 in the direction of flow of the heat-transfer fluid FC within the conveying circuit; and a second valve arranged on the third channel upstream of the third point P3 in the direction of flow of the heat-transfer fluid FC within the conveying circuit.

The heat-transfer fluid FC is preferably a mixture of water and glycol, while the refrigerant FR is preferably a supercritical fluid.

The conveying circuit preferably comprises an engine or motor of the vehicle.

The gas cooler advantageously comprises a flow circuit for the refrigerant FR that is counter-current to the flow paths of the heat-transfer fluid FC.

The flow circuit of the refrigerant FR is preferably single-passage vis-à-vis the flow paths of the heat-transfer fluid FC.

DESCRIPTION OF THE FIGURES

The present invention will be understood more clearly, and various of its details will be found, on reading the following description of variants with reference to the figures of the attached plates of drawings, in which:

In FIGS. 1 and 2 a motor vehicle is equipped with a heating, ventilation, and/or air-conditioning system 1 for modifying the thermal parameters of the air in the passenger compartment. Such modification is achieved by feeding into the passenger compartment a first air stream 2, designed to be heated, and/or a second air stream 3, designed to be cooled.

Figure 1:
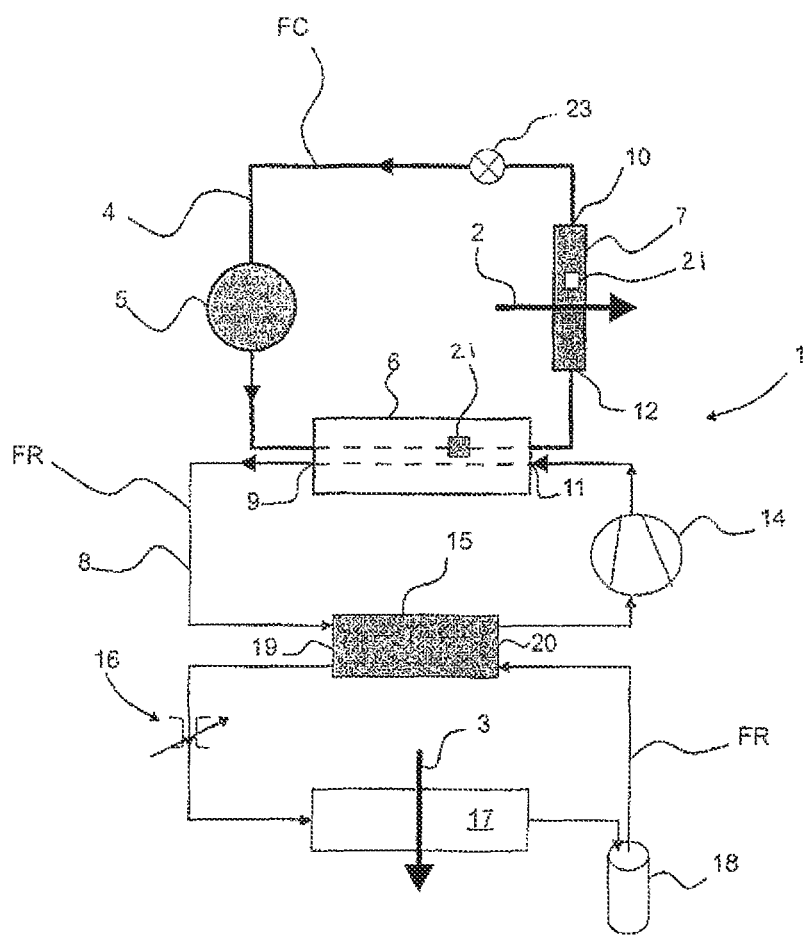
FIGS. 1 and 2 are schematic illustrations of respective variants of a heating, ventilation, and/or air-conditioning system according to the present invention.

Said system 1 comprises a conveying circuit 4 for a heat-transfer fluid FC, typically water and/or glycol. The conveying circuit 4 comprises elements 5, 6 which dissipate heat in the course of their operation and at least one radiator 7 for evacuating the heat collected by the heat-transfer fluid FC from said elements 5, 6. The elements 5, 6 may for example be an engine or motor 5 (it may be a heat engine, an electric motor or a hybrid engine) of the vehicle, and a gas cooler 6 for an air-conditioning loop 8 which is also part of the system 1. The radiator 7 is designed to heat the first air stream 2 before feeding it into the passenger compartment. The function of the gas cooler 6 is to extract heat from a refrigerant FR flowing around the air-conditioning loop 8, and more particularly through the gas cooler 6.

To optimize the efficiency of said system 1, it is of the utmost importance that the respective heat exchanges carried out both by the radiator 7 and by the gas cooler 6 are themselves as satisfactory as possible. Hitherto it has been felt that such heat exchanges were optimized if and only if the heat-transfer fluid FC flowed through the radiator 7 and/or through the gas cooler 6 at a significant flow rate, generally above 1000 l/h.

The present invention shows that, under the abovementioned conditions of use of the radiator 7 and gas cooler 6, the heat exchanges occurring inside both the radiator 7 and the gas cooler 6 are optimal on condition that the flow rate of the heat-transfer fluid FC flowing through them is between 40 l/h and 200 l/h. Such a condition must not be regarded as an arbitrary decision as to size and/or something selected at random, but as the result of an inventive step which goes against the thought habits of the industry. Specifically, the designers of the present invention have chosen the opposite of what is commonly taught by the prior art, by preferring a low flow rate of the heat-transfer fluid FC through the radiator 7 and gas cooler 6 and, conjointly, a large temperature difference of the heat-transfer fluid FC between an outlet 9, 10 and an inlet 11, 12 of the gas cooler 6 and of the radiator 7 respectively, this difference being greater than 45° C., and preferably between 60° C. and 80° C.

Figure 2:
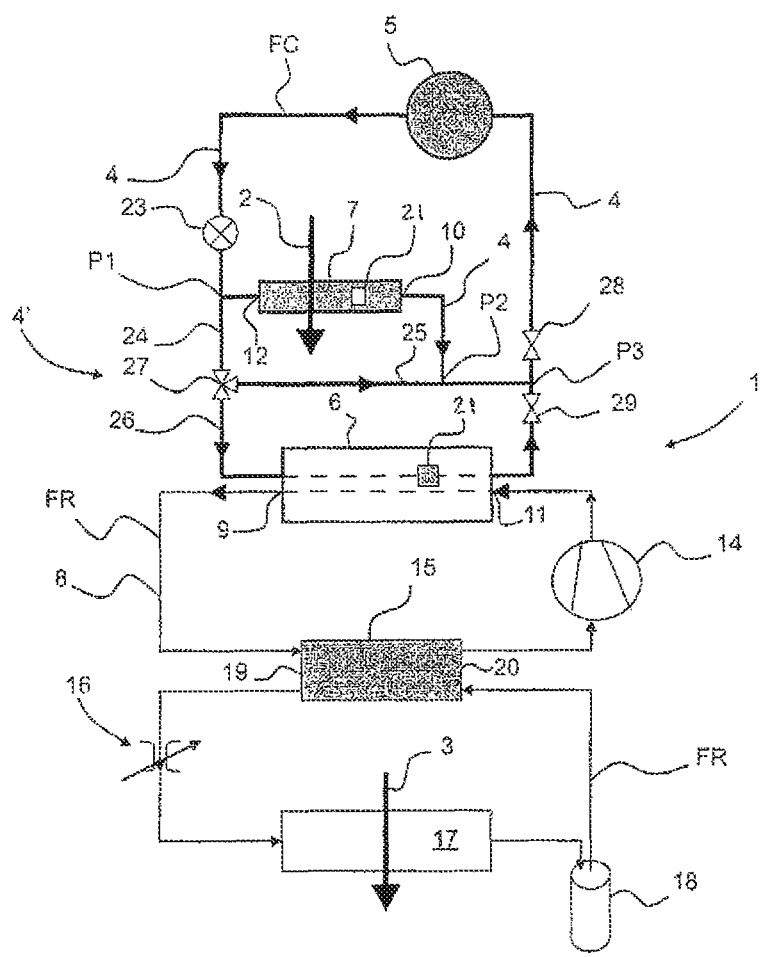

As a result of this, a heating, ventilation and/or air-conditioning system 1 according to the present invention is equipped with at least one means for pumping the heat-transfer fluid FC at a flow rate of 40 l/h to 200 l/h, in order to facilitate said heat exchange, to improve the efficiency of said system 1, and in particular so that the refrigerant FR flowing through the gas cooler 6 undergoes and ABCD thermodynamic cycle, illustrated in FIG. 2, with a coefficient of performance greater than 3, and ideally approaching 4.

In addition to the gas cooler 6, the air-conditioning loop 8 comprises a compressor 14, an internal heat exchanger 15, an expansion member 16, an evaporator 17, and an accumulator 18 around which flows the refrigerant FR, such as a supercritical fluid, R744 or analogue in particular.

The refrigerant flows from the compressor 14 to the gas cooler 6, then to a first arm 19 of the internal heat exchanger 15, then to the expansion member 16 on to the evaporator 17, thence to the accumulator 18, and finally to a second arm 20 of the internal heat exchanger 15, before returning to the compressor 14.

The compressor 14 is designed to receive the refrigerant FR in the gaseous state and compress it to a high pressure. The gas cooler 6 is designed to cool the compressed refrigerant FR, at a relatively constant pressure, by giving up the heat to the heat-transfer fluid FC. The internal heat exchanger 15 is configured in such a way that the refrigerant FR flowing through the first arm 19 can give up the heat to the refrigerant FR flowing through the second arm 20. For this purpose the refrigerant FR flows in opposite directions through the first arm 19 and through the second arm 20. The expansion member 16 is capable of lowering the pressure of the refrigerant FR leaving the gas cooler 6 until it is at least partly in the liquid state. The evaporator 17 is designed to change to the gaseous state the refrigerant FR arriving in the liquid state from the expansion member 16, at a relatively constant pressure, by cooling the second air stream 3 which passes through the evaporator 17. The accumulator 18 is designed to collect any remaining refrigerant FR in the liquid state leaving the evaporator 17, in such a way that only refrigerant FR in the gaseous state is aspirated by the compressor 14.

Figure 3:
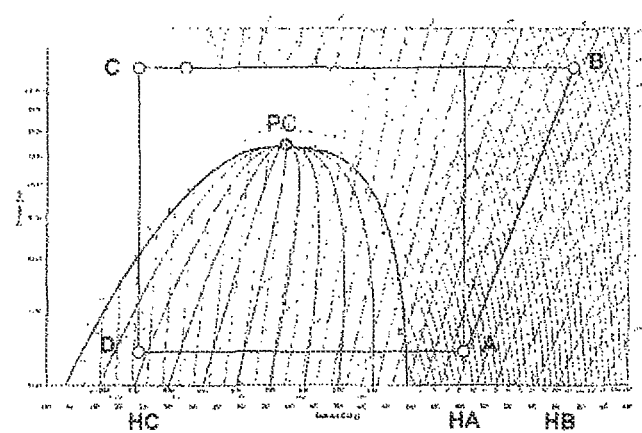
FIG. 3 is a Mollier diagram representing a thermodynamic cycle of a refrigerant flowing around an air-conditioning loop that is a constituent of the systems illustrated in the preceding figures.

In FIG. 3 a Mollier diagram shows the thermodynamic cycle ABCD applied to the refrigerant FR flowing through the air-conditioning loop 8. Segment AB represents the isentropic compression of the refrigerant FR by the compressor 14. Segment BC illustrates the amount of heat given up by the gas cooler 6. Segment CD symbolizes the isenthalpic expansion of the refrigerant FR in the expansion member 16. Segment DA represents the amount of heat extracted by the evaporator 17 from the second air stream 3.

A coefficient of performance or COP of the air-conditioning loop 8 is defined as the ratio of the amount of heat extracted to the work supplied, that is the ratio (HB–HC)/(HB–HA), in which HA is the value of the enthalpy of point A, HB is the value of the enthalpy of point B and HC is the value of the enthalpy of point C. The air-conditioning loop 8 comprising a gas cooler 6 according to the present invention has a COP of more than 3, and ideally approaching 4. The point of operation of said loop 8 is determined by a low-pressure section of the latter 8 which extends from the expansion member 16 to the compressor 14, in the direction of flow of the refrigerant FR through the air-conditioning loop 8. The point of operation of the latter 8 is also determined by the desired temperature of evaporation of the refrigerant FR and by characteristics of the compressor 14, such as its efficiency and/or the maximum admissible temperature of the refrigerant FR on discharge. Such determinations define state conditions of pressure and temperature of the refrigerant FR as it enters and leaves the compressor 14. These state conditions prove to be significant constraints on designers of heating, ventilation, and/or air-conditioning systems 1 which leave little room for engineering them to minimize the difference (HB–HA) and thereby maximize the COP.

Lastly, it will be seen that in order to increase the heat collected by the heat-transfer fluid FC from the gas cooler 6, in other words make the COP as high as possible, the temperature of the refrigerant FR must be as low as possible as it comes out of the gas cooler 6, in other words the difference (HB–HC) must be maximized. This is particularly important because the variation of enthalpy associated with cooling the refrigerant FR is greater between 20° C. and 60° C. than between 60° and 100° C., because of the steep gradient of the isothermal curves relative to the horizontal at the critical point PC.

Having opted to equip said system 1 with said means for pumping the heat-transfer fluid FC at a flow rate of between 40 l/h to 200 l/h, the designers of the present invention offer a number of variants of the means that can be applied to the system 1, either independently or in combination.

Referring again to FIG. 1 and FIG. 2, and taking first variant of said means, the latter is a pump 23 with a variable and controlled flow rate which is a constituent of the conveying circuit 4 and is capable of maintaining the circulation of the heat-transfer fluid FC at a flow rate of between 40 l/h to 200 l/h.

In FIG. 1 the pump 23, the engine or motor 5, the gas cooler 6, and the radiator 7 are arranged in that order in series on the conveying circuit 4. In other embodiments the order may differ.

In FIG. 2 the conveying circuit 4 comprises a branch 4' on which the gas cooler 6 is installed. The branch 4' comprises:
 a first channel 24 extending between a three-way valve 27 and a first junction point P1 located on the conveying circuit 4 upstream of the radiator 7 in the direction of flow of the heat-transfer fluid FC within the conveying circuit 4,
 a second channel 25 extending between the three-way valve 27 and a second junction point P2 located on the conveying circuit 4 downstream of the radiator 7 in the direction of flow of the heat-transfer fluid FC within the conveying circuit 4, and
 a third channel 26 extending between the three-way valve 27 and a third junction point P3 located on the conveying circuit 4 downstream of the radiator 7 in the direction of flow of the heat-transfer fluid FC within the conveying circuit 4. The gas cooler 6 is arranged on the third channel 26.

In a second variant of said means, the latter consists of: the three-way valve 27; a first valve 28 arranged on the conveying circuit 4 downstream of the third point P3 in the direction of flow of the heat-transfer fluid FC within the conveying circuit 4; and a second valve 29 arranged on the third channel 26 upstream of the third point P3 in the direction of flow of the heat-transfer fluid FC within the conveying circuit 4.

Figure 4:
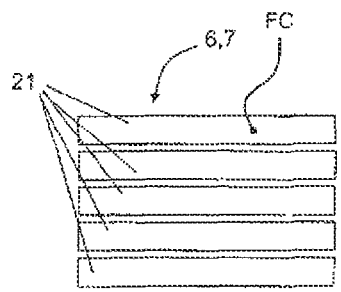
FIG. 4 is a partial schematic illustration of one embodiment of a means for pumping a heat-transfer fluid at a flow rate of 40 l/h to 200 l/h through a heat exchanger that is a constituent of the systems illustrated in FIGS. 1 and 2.
Figure 5:
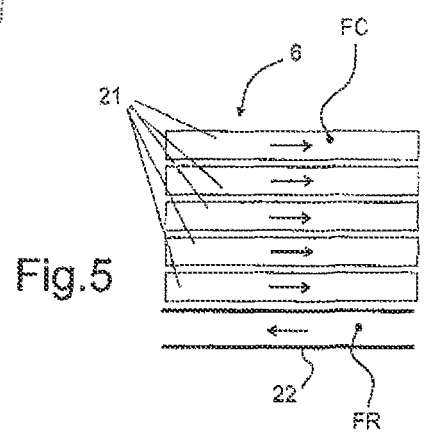
FIG. 5 is a partial schematic illustration of a gas cooler provided with the means illustrated in FIG. 4.

Referring also to FIG. 4 and FIG. 5, and in a third variant of said means, the latter consists of a plurality of flow paths 21 carrying the heat-transfer fluid FC around the heat exchanger 6, 7, which may be a gas cooler 6 or a radiator 7.

In FIG. 5 the gas cooler 6 comprises a flow circuit 22 for the refrigerant FR that is counter-current and single-passage with respect to the flow paths 21 of the heat-transfer fluid FC. In other words, within the gas cooler 6 the refrigerant FR flows in the opposite direction to the direction of the heat-transfer fluid FC, this counter-current flow being performed once only.

These arrangements are such that said system 1 has the following characteristics set out in the first four columns of the following table relating to four different modes of operation of said system 1, while the fifth column shows the characteristics of a prior art system.

|  | Units | Embdmt 1 | Embdmt 2 | Embdmt 3 | Embdmt 4 | Prior art |
| --- | --- | --- | --- | --- | --- | --- |
| Heating power of radiator | kW | 5.6 | 5 | 4.5 | 4 | 5.6 |
| Flow rate of fluid FC | l/h | 120 | 80 | 60 | 45 | 1000 |

-continued

|  | Units | Embdmt 1 | Embdmt 2 | Embdmt 3 | Embdmt 4 | Prior art |
|---|---|---|---|---|---|---|
| Inlet/Outlet temperature difference of fluid FC | °C. | 46.7 | 62.5 | 75 | 88.9 | 5.6 |
| Inlet temperature of fluid FC | °C. | 60 | 70 | 75 | 85 | 48 |
| Outlet temperature of fluid FC | °C. | 13.3 | 7.5 | 0 | −3.9 | 42.4 |
| Inlet temperature of fluid FR | °C. | 122 | 122 | 122 | 122 |  |
| Outlet temperature of fluid FR | °C. | >14 | >7.5 | >0 | >3 | >43 |
| Air flow rate through radiator | kg/h | 300 | 300 | 300 | 300 | 300 |
| Inlet/Outlet air temperature difference | °C. | 67.2 | 60 | 54 | 48 | 67.2 |
| Inlet air temperature | °C. | −20 | −20 | −20 | −20 | −20 |
| Outlet air temperature | °C. | 47.2 | 40 | 34 | 28 | 47.2 |

In this table the fluid FC relates to the heat-transfer fluid FC flowing around the conveying circuit 4 while the fluid FR relates to the refrigerant FR flowing around the air-conditioning loop 8.

As an example, if the operation of a system according to the prior art is compared with the first operation of a system 1 according to the present invention, it will be clear that the temperature of the refrigerant FR leaving the gas cooler 6 is much lower when operating Embodiment 1 than when operating the prior art embodiment. It follows that the COP of Embodiment 1 is much better than that of the prior art.

The invention claimed is:

1. A system (1) for the heating, ventilation, and/or air conditioning of a motor vehicle passenger compartment, said system (1) comprising:
   at least one heat exchanger (6, 7) through which there flows a heat-transfer fluid (FC), wherein a first of said at least one heat exchanger (6, 7) is a radiator (7) and a second of said at least one heat exchanger (6, 7) is a gas cooler (6) participating in an air-conditioning loop (8) around which a refrigerant (FR) flows;
   at least one means for pumping the heat-transfer fluid (FC) at a flow rate of between 40 liters per hour (l/h) and 200 l/h, in such a way that a temperature difference of the heat-transfer fluid (FC) between an outlet (9, 10) and an inlet (11, 12) of the heat exchanger (6, 7) is greater than 45° C., whereby a coefficient of performance between 3 and 4 is maintained in said air-conditioning loop (8); and
   a conveying circuit (4) that includes a branch (4) on which said gas cooler (6) is installed, said branch (4') includes:
   a first channel (24) extending directly between a three-way valve (27) and a first junction point (P1) located on said conveying circuit (4) upstream of the radiator (7) in the direction of flow of the heat-transfer fluid (FC) within said conveying circuit (4),
   a second channel (25) extending directly between said three-way valve (27) and a second junction point (P2) located on said conveying circuit (4) downstream of the radiator (7) in the direction of flow of the heat-transfer fluid (FC) within said conveying circuit (4), and
   a third channel (26) extending between said three-way valve (27) and a third junction point (P3) located on said conveying circuit (4) downstream of the radiator (7) in the direction of flow of the heat-transfer fluid (FC) within said conveying circuit (4);
   wherein said means for pumping comprises: said three-way valve (27): a first valve (28) arranged on said conveying circuit (4) downstream of the third junction point (P3) in the direction of flow of the heat-transfer fluid (FC) within said conveying circuit (4); and a second valve (29) arranged on said third channel (26) upstream of the third point (P3) in the direction of flow of the heat-transfer fluid (FC) within said conveying circuit (4).

2. A system (1) according to claim 1, wherein said means for pumping is a constituent of a conveying circuit (4) for the heat-transfer fluid (FC).

3. A system (1) according to claim 2, wherein said means for pumping further comprises a pump (23) with a variable and controlled flow rate participating in said conveying circuit (4).

4. A system (1) according to claim 2, wherein said means for pumping further comprises a plurality of flow paths (21) for the heat-transfer fluid (FC) which are formed within said at least one heat exchanger (6, 7).

5. A system (1) according to claim 2, wherein said conveying circuit (4) comprises an engine or motor (5) of the vehicle.

6. A system (1) according to claim 1, wherein said gas cooler (6) is a constituent of the conveying circuit (4).

7. A system (1) according to claim 1, wherein said gas cooler (6) is arranged on said third channel (26).

8. A system (1) according to claim 1, wherein the heat-transfer fluid (FC) is a mixture of water and glycol.

9. A system (1) according to claim 1, wherein the refrigerant (FR) is a supercritical fluid.

10. A system (1) according to claim 1, wherein said gas cooler (6) comprises a flow circuit (22) for the refrigerant (FR) that is counter-current to the flow paths (21) of the heat-transfer fluid (FC).

11. A system (1) according to claim 10, wherein said flow circuit (22) of the refrigerant (FR) is single-passage vis-a-vis the flow paths (21) of the heat-transfer fluid (FC).

* * * * *